March 31, 1925.  
O. E. ST. JOHN  
1,531,355  
MACHINE FOR MAKING BUSHEL BASKET MATS  
Filed Jan. 9, 1924  2 Sheets-Sheet 1
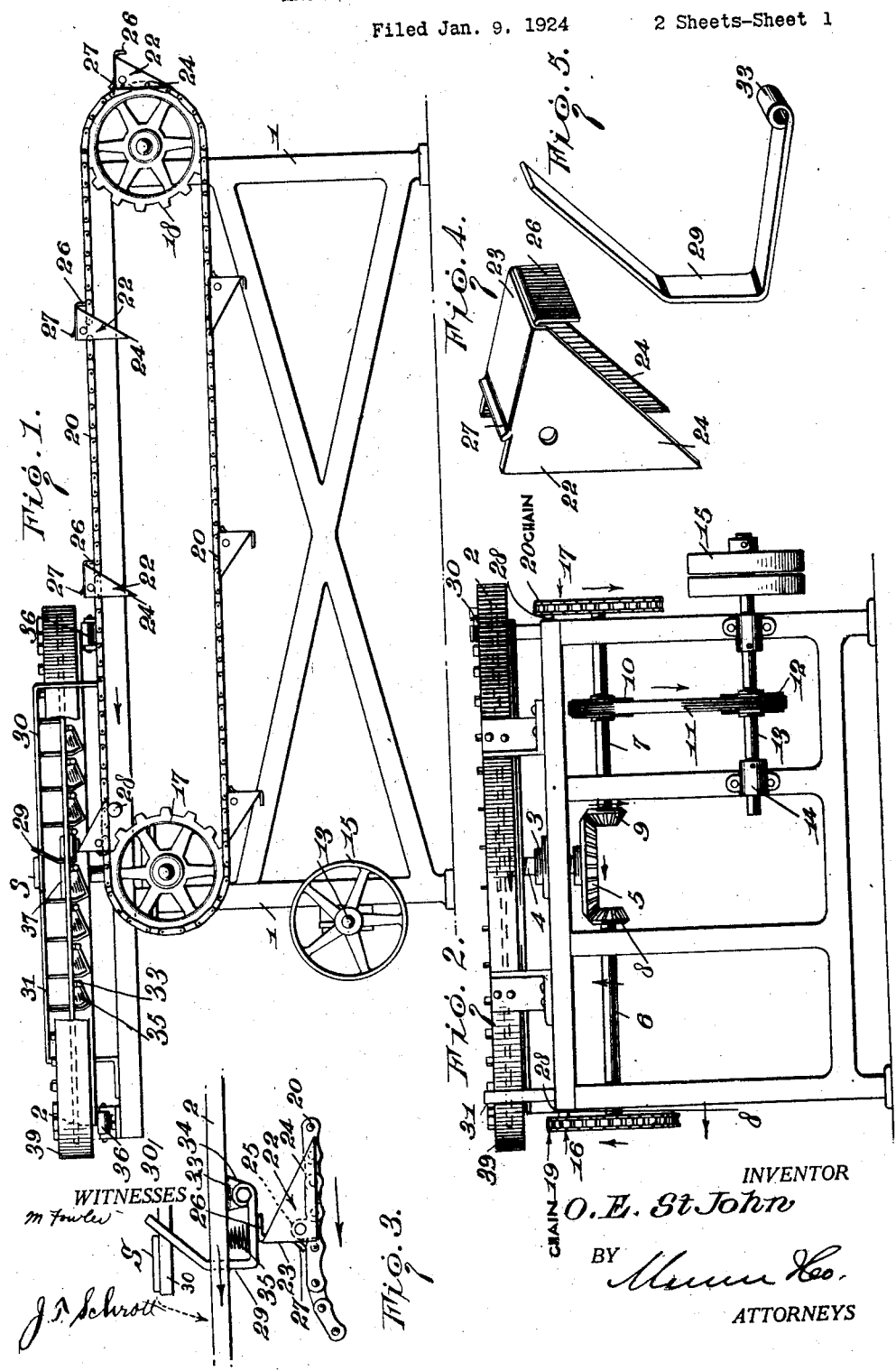
INVENTOR
O. E. St John March 31, 1925.  1,531,355
O. E. ST. JOHN
MACHINE FOR MAKING BUSHEL BASKET MATS
Filed Jan. 9, 1924   2 Sheets-Sheet 2
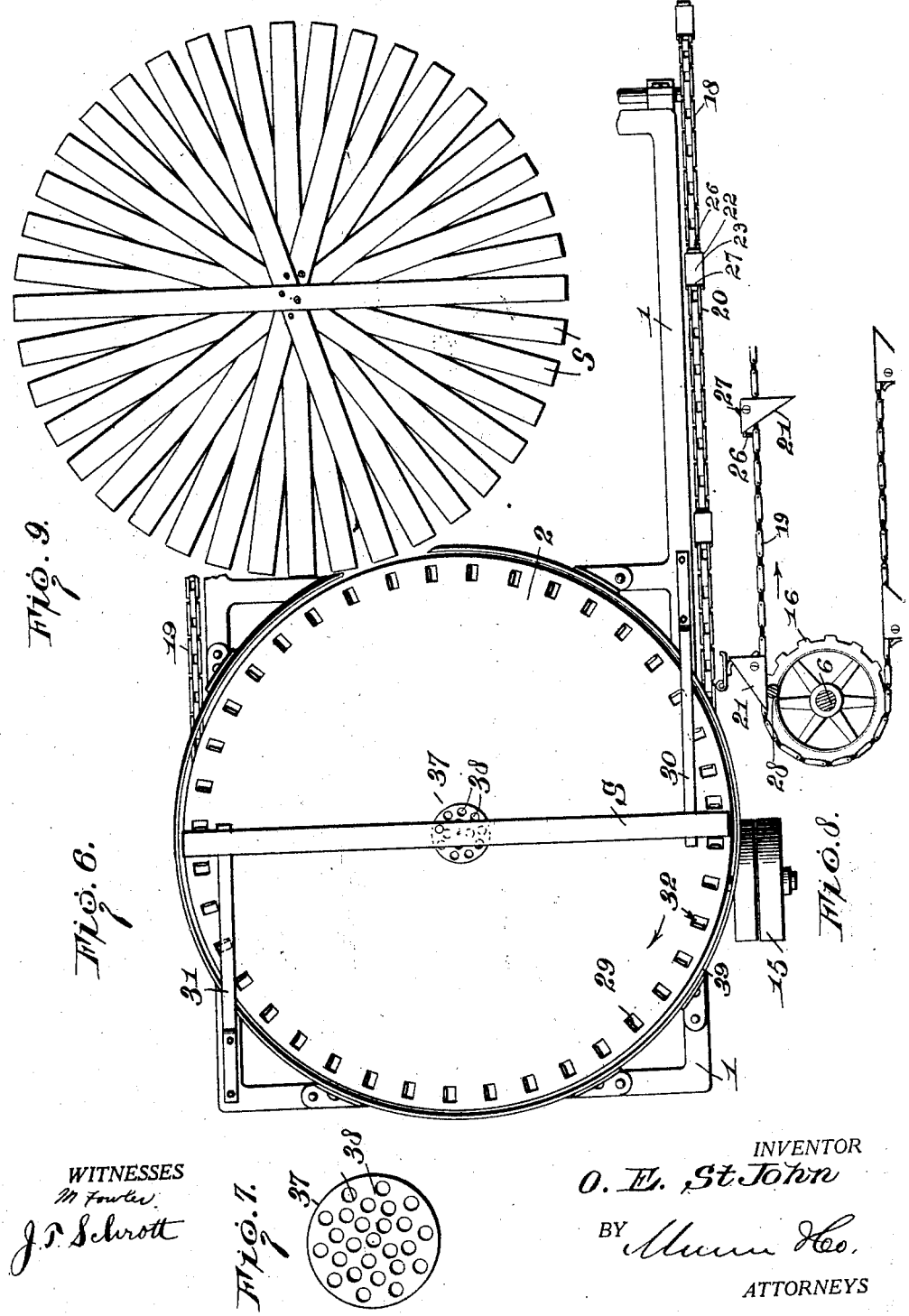
WITNESSES
INVENTOR
O. E. St John
BY
ATTORNEYS Patented Mar. 31, 1925.

1,531,355

UNITED STATES PATENT OFFICE.

ORESTA EUGENE ST. JOHN, OF GLOVERSVILLE, NEW YORK.

MACHINE FOR MAKING BUSHEL-BASKET MATS.

Application filed January 9, 1924. Serial No. 685,225.

*To all whom it may concern:*

Be it known that I, ORESTA EUGENE ST. JOHN, a citizen of the United States, and resident of Gloversville, in the county of Fulton and State of New York, have invented certain new and useful Improvements in Machines for Making Bushel-Basket Mats, of which the following is a specification.

My invention relates to improvements in bushel basket braiding machines and it consists of the constructions, combinations and arrangements herein described and claimed.

An object of the invention is to provide a machine to correctly and accurately form or braid mats of which bushel baskets are subsequently made.

Another object of the invention is to provide a machine of the character specified which is intended to cooperate with a machine which furnishes the staves, the purpose of the machine being to arrange the staves in circular mat formation and hold them in such formation until they can be fastened together in preparation to the making of a bushel basket.

Other objects and advantages will appear in the following specification reference being had to the accompanying drawings, in which—

Figure 1 is a side elevation of the mat making machine.

Figure 2 is an end elevation thereof.

Figure 3 is a detail view illustrating the action of the chain lugs on the stave spacing fingers.

Figure 4 is a perspective view of one of the lugs.

Figure 5 is a perspective view of one of the fingers.

Figure 6 is a plan view of a part of the machine more particularly illustrating the disposition of the fingers around the periphery of the braiding board.

Figure 7 is a detail view of the central clinch block.

Figure 8 is a detail section taken substantially on the line 8—8 of Figure 2 and illustrating the arrangement of lugs on the chain on the far side.

Figure 9 is a plan view of the completed basket mat.

The purpose of the invention, as briefly outlined in the above objects is to form circular mats which are, as illustrated in Figure 9 for the purpose of making bushel baskets. These mats are placed in a machine intended for the particular purpose and are there so bent over as to form the bushel baskets which are familiar to everyone. The staves of which the mats are made consists of wood veneer.

In carrying out the invention provision is made of a frame 1 at one end of which the braiding board 2 is situated. This board is circular as shown in Figure 6. The braiding board is supported by a bearing 3 upon which it turns in the direction of the arrows by means of the vertical shaft 4 which extends down through the frame and carries a beveled gear 5.

A pair of sprocket shafts 6 and 7 each carry pinions 8 and 9 which mesh with the gear 5. These shafts are suitably journaled in the frame 1 in the horizontal position. The shaft 7 carries a pulley 10 which is driven by a belt 11 from a pulley 12 on a counter shaft 13. This shaft is journaled in bearings 14 and carries a pulley or suitable arrangement of pulleys 15 by means of which the machine is driven from a suitable source.

Mounted on the extremities of the respective shafts 6 and 7 on the outside of the frame 1 are sprocket wheels 16 and 17. Each of the sprocket wheels has a companion sprocket wheel situated at the rear of the frame, for example the wheel 18 in Figure 1; the pairs of sprocket wheels on the respective sides of the frame carrying chains 19 and 20 upon which lugs 21 (Fig. 8) and 22 (Fig. 1) are mounted at determined intervals.

The operation of the braiding board and chains is continuous. The braiding board revolves in a clockwise direction. The chain 20 moves from right to left, but the chain 19 moves from left to right due to the arrangement of gearing in Figure 2.

The rear sprocket wheels, 18 for example, must be so mounted that they may revolve independently because they move in opposite directions. The lugs 22 are of substantial triangular formation as clearly shown in Figure 4, they being so bent as to provide a bridge 23 and a pair of wings 24. Each lug is pivoted on a suitable link 25 of the chain 20 (Fig. 3) by means of the wings 24. The bridge 23 crosses the top of the chain, a suitably arranged stop 26 engaging the chain to keep the lug in proper upright position when traversing the upper path of movement.

The bridge 23 falls short of the leading edges 24 and is slightly curled up at 27 to provide a secondary stop for limiting the movement of the lugs when raising the fingers on the braiding board.

This is accomplished by a trip pin 28 on each side of the frame. Each trip pin operates in respect to the pivoted lugs of the respective sides of the frame. The chains advance the lugs toward the trip pins and when the lugs engage said pins, they turn into such positions in which the stops 26 raise adjacent fingers 29 preparatory to displacing a stave S then in place on the rest 30 at 31.

There are forty of the fingers 29 evenly distributed around the braiding board 2 close to the periphery. Each of the fingers operates in its individual recess 32. Each finger is pivoted at 33 on a lug 34 beneath the board, a spring 35 serving both to depress the finger and limit the downward movement thereof in its recess 32 when disengaged from a lug 21 or 22, as the case may be.

The finger 29 is bent to provide portions at right angles to each other, these being situated beneath the board. That portion of the finger which extends through the aperture 32 is bent at an angle to the part which carries it. It is this protruding part of the finger that pushes the staves S off. This part stands erect to the braiding board when the finger is depressed, but assumes more of a pushing position when the finger is projected.

In order to adequately support the braiding board a plurality of rollers 36 is provided, these being distributed at suitable places. Situated in the center of the braiding board is a clinch block 37 (Fig. 7) the upper surface of which has a large number of concavities 38 for the purpose of upsetting or clinching the nails or brads when driven through the formed mat, as a final operation. A guard 39 extends completely around the braiding board to keep the staves in position until they are nailed in the center.

The operation may be readily understood from the following description. Staves S are delivered to the rests 30 and 31 by automatic feeders which have no relation to this invention.

The staves are delivered in a position crosswise of the machine as shown in Figure 6. The fingers 29 rotate with the braiding board 2 beneath the rests, and at regular intervals a pair of lugs 21 and 22 will raise a pair of fingers 29, one on opposite sides of the braiding board, and push the staves off of the rests into the space between adjacent pairs of fingers.

The action of the fingers at opposite sides of the braiding board is simultaneous. The chains 19 and 20 move in opposite directions in conformity with the direction of movement of the braiding board at opposite sides of the frame, but the lugs 21 and 22 carried by the respective chains are so positioned that they will simultaneously engage the trip pins 28 and raise the nearest fingers 29 simultaneously as already stated.

The movement of the braiding board does the rest. The opposite pairs of fingers 29 having been raised, the stave S is pushed off of the rests 30 and 31 and into the space in front of said fingers. The action of the fingers 29 is not successive, that is to stay the fingers are not raised in turn.

This is clearly seen in Figure 9. Inasmuch as the peripheral speed of the braiding board 2 is greater than that of the speed of the lugs 21 and 22 it follows that a number of pairs of fingers 29 will be skipped before the next stave S is pushed off. According to Figure 9 seven pairs of fingers pass before another stave is dislodged from the rest. The eighth pair of fingers will be engaged by the lugs 21 and 22 then in position with the result that the stave then on the rests will be moved to its position on the braiding board.

This action continues until twenty staves have been deposited on the board. The machine may now be stopped so that nails may be driven through the center of the mat to hold the staves in the relative positions shown in Figure 9. The nails or brads are clinched on the under side by the concavities 38 in the clinch block 37. The mat is now taken off of the machine, later to be made into a bushel basket.

While the construction and arrangement of the improved basket mat making machine as herein described and claimed is that of a generally preferred form, obviously modifications and changes may be made without departing from the spirit of the invention or the scope of the appended claims.

I claim:—

1. A machine for the purpose described comprising rests to which staves are delivered in succession, a board rotating beneath the rests, pushers pivotally carried by the board, and means including moving chains having means to extend opposite pairs of pushers at determined times to dislodge the staves from the rests until a mat is formed on the board.

2. A machine for the purpose described comprising rests to which staves are delivered in succession, a circular board revolving beneath the rests, pushers carried by the board near the periphery, and means including chains travelling oppositely to agree with the direction of rotation of the board at opposite sides, said chains having means for extending opposite pairs of pushers at intervals other than consecutive while the board revolves to dislodge staves until a mat is formed covering the board.

3. A machine for the purpose described comprising rests to which staves are delivered, a circular board revolving beneath the rests, fingers reciprocatingly carried by apertures in the board, means pivotally mounted beneath the board by which said fingers are carried, resilient means engaging said pivoted means holding the fingers in depressed positions to escape the rests, traveling chains, lugs carried by the chains simultaneously engaging opposite pairs of fingers beneath the board at intervals to project them beyond the rests and dislodge staves until a mat is formed on the board, and a block on the board upon which fastening nails are clinched.

4. A machine for the purpose described comprising rests to which staves are delivered, a circular perforated board revolving beneath the rests, fingers pivotal upon the board to extend through the perforations, resilient means keeping the fingers depressed to escape the rests, chains at opposite sides of the board travelling in opposite directions to agree with the direction of movement of the board at said opposite sides, lugs carried by both chains to simultaneously engage opposite fingers at intervals to extend them beyond the rests and dislodge staves until a mat is formed on the board, and a block on the board upon which fastening nails are clinched.

5. A machine for the purpose described comprising a frame, a pair of aligning shafts journaled on the frame having confronting pinions, a gear meshing with both pinions and mounted on an upright shaft, means to drive one of the shafts thereby driving all, chains at the sides of the frame driven by sprockets on said pair of shafts and thereby moving in opposite directions by virtue of the arrangement of the gearing, a circular board carried by the upright shaft movable over the chains but in the same directions as the chains on the respective sides, rests on the frame to receive staves, fingers carried by the boards moving beneath the rests, and including portions situated beneath the board, pivoted lugs carried by the chains at equal distances apart, and means situated to trip lugs on each chain simultaneously to extend a pair of fingers above the rests at opposite sides of the board and dislodge staves until a circular mat is formed.

6. A device for the purpose described comprising a frame, a pair of sprockets on each side connected by chains, a circular board on top of the frame, means to operate the board and sprockets together, said chains moving in opposite directions to agree with the directions of movement of the board at opposite sides, a plurality of spring fingers working through the board near the periphery, rests on the frame extending above the board to receive stays, pivoted lugs carried by the chains, a pin on each side of the frame adjacent to the board to trip the lugs as they approach the board to in turn project opposite pairs of fingers simultaneously above the rest to dislodge a stave, this action being repeated until the circular board is covered with a mat; and a block in the center of the board upon which fastening nails are clinched.

7. In a device of the character described, a revolving board having a pivoted finger, a chain moving beneath the board, a lug pivoted on the chain having an end stop engaging the chain to hold the lug in position, and a pin in the path of the lug to move said stop beneath the finger and extend it above the board.

8. In a device of the character described, a revolving board, a pivoted finger carried by the board, a chain moving beneath the board, a lug pivoted on the chain, a stop engaging the chain when the lug is in the pendant position, a pin over which the lug passes whereupon said stop engages the finger to extend it above the board, and a secondary stop on the lug engaging the chain while the lug is in engagement with said pin.

9. In a device of the character described, a chain, a lug pivoted on the chain composed of a bridge and a pair of wings extending beside the chain, a stop at one end of the bridge to engage the chain when the lug is in one position and a secondary stop at the other end of the bridge to engage the chain when the lug is in another position.

ORESTA EUGENE ST. JOHN.